(12) United States Patent
Tanaka (10) Patent No.: US 8,670,030 B2
(45) Date of Patent: Mar. 11, 2014

(54) PHOTOGRAPHING DEVICE AND CONTROL METHOD THEREFOR

(75) Inventor: Takaomi Tanaka, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 303 days.

(21) Appl. No.: 13/114,837

(22) Filed: May 24, 2011

(65) Prior Publication Data

US 2011/0292202 A1 Dec. 1, 2011

(30) Foreign Application Priority Data

May 25, 2010 (JP) ................................. 2010-119244

(51) Int. Cl.
*H04N 13/00* (2006.01)

(52) U.S. Cl.
USPC .......... 348/81; 348/136; 348/231.99; 396/25; 396/26

(58) Field of Classification Search
USPC .......................................................... 348/81
See application file for complete search history.

(56) References Cited

U.S. PATENT DOCUMENTS

| 5,365,290 | A  | * | 11/1994 | Suzuki et al. | .................... | 396/26 |
| 5,826,113 | A  | * | 10/1998 | Nonaka | ............................. | 396/25 |
| 2003/0038876 | A1 | * | 2/2003 | Nagashima | ...................... | 348/81 |
| 2004/0022129 | A1 | * | 2/2004 | McGeever, Jr. | ............... | 367/128 |
| 2005/0066871 | A1 | * | 3/2005 | Shelton | ......................... | 114/312 |
| 2006/0010699 | A1 | * | 1/2006 | Tamura | ......................... | 33/355 R |
| 2006/0098105 | A1 | * | 5/2006 | Okisu et al. | .............. | 348/231.99 |
| 2008/0158391 | A1 | * | 7/2008 | Suzuki | ...................... | 348/231.99 |
| 2009/0040315 | A1 | * | 2/2009 | Nakase et al. | ........... | 348/207.99 |
| 2010/0053323 | A1 | * | 3/2010 | Izawa | ............................. | 348/136 |

FOREIGN PATENT DOCUMENTS

| CN | 101206384 | 6/2008 |
| JP | 06-067277 | 3/1994 |
| JP | 2003-283977 | 10/2003 |

OTHER PUBLICATIONS

Office Action in Chinese Patent Application No. 201110135743.6, mailed on Mar. 27, 2013 (11 pgs.), with translation (10 pgs.).

* cited by examiner

*Primary Examiner* — Dave Czekaj
*Assistant Examiner* — Md Haque
(74) *Attorney, Agent, or Firm* — John C. Pokotylo; Straub & Pokotylo (57) ABSTRACT

A photographing device includes a pressure sensor that detects a pressure received by the photographing device; a detection unit that detects whether the photographing device is placed in the water or in the air; and a storage unit that stores image information. A controller of the photographing device starts an operation of generating time-series pressure data on the basis of an output of the pressure sensor when a first state, in which the photographing device is placed from the air into the water, is detected. The controller stops the operation of generating the time-series pressure data when a second state, in which the photographing device is placed from the water into the air, is detected, associate the image file stored in the storage unit from the first state to the second state with the time-series pressure data, and store again the image file in the storage unit.

4 Claims, 7 Drawing Sheets

LogData.dat

| |
|---|
| UNDERWATER PHOTOGRAPHING START TIME |
| UNDERWATER PHOTOGRAPHING END TIME |
| UNDERWATER PHOTOGRAPHING START POSITION |
| UNDERWATER PHOTOGRAPHING END POSITION |
| DATA MEASUREMENT INTERVAL |
| PRESSURE (P1) |
| ACCELERATION (A1) |
| ANGULAR VELOCITY (θ1) |
| AZIMUTH (φ1) |
| PRESSURE (P2) |
| ACCELERATION (A2) |
| ANGULAR VELOCITY (θ2) |
| AZIMUTH (φ2) |
| ⁓ |
| PRESSURE (Pn) |
| ACCELERATION (An) |
| ANGULAR VELOCITY (θn) |
| AZIMUTH (φn) |
| PHOTOGRAPHING TIME xx:xx／Pxxx011.jpg |
| PHOTOGRAPHING TIME xx:xx／Pxxx012.jpg |
| ⁓ |
| PHOTOGRAPHING TIME xx:xx／Pxxx020.jpg |

FIG. 10

PHOTOGRAPHING DEVICE AND CONTROL METHOD THEREFOR

FIELD OF THE INVENTION

The present invention relates to a photographing device capable of underwater photographing and a control method therefor.

BACKGROUND OF THE INVENTION

A camera disclosed in JP6-67277A can record data of a water depth where a photograph was taken in a magnetic recording unit disposed in a film.

The camera disclosed in JP6-67277A records only water depth data when a photographing operation was performed along with image data. The camera records one image data associated with one water depth data. For example, when a user sees the image data photographed underwater during diving after some time has elapsed, the water depth data is one type of information that can become a clue to recall the scene or situation in which the photographing was performed.

SUMMARY OF THE INVENTION

A photographing device according to one aspect of this invention is capable of a photographing operation in the water. The photographing device comprises an operation unit that instructs start of the photographing operation; a photographing unit that obtains a subject image as image data; a pressure sensor that detects a pressure received by the photographing device; a detection unit that detects whether the photographing device is placed in the water or in the air; a storage unit that stores image information; and a controller that generates an image file on the basis of the image data and stores the image file in the storage unit if the operation unit is operated. The controller functions to: start an operation of generating time-series pressure data on the basis of an output of the pressure sensor when a first state, in which the photographing device is placed from the air into the water, is detected from an output of the detection unit. The controller functions to stop the operation of generating the time-series pressure data when a second state, in which the photographing device is placed from the water into the air, is detected from an output of the detection unit, associate the image file stored in the storage unit from the first state to the second state with the time-series pressure data, and store again the image file in the storage unit.

A control method of controlling a photographing device according to another aspect of this invention is capable of a photographing operation in the water. The control method comprises a detecting step of detecting whether the photographing device is placed in the water or in the air; a first generating step of generating time-series pressure data by measuring a pressure received by the photographing device in a predetermined cycle when a first state in which the photographing device is placed from the air into the water is detected in the detecting step; an obtaining step of making a photographing unit obtain a subject image as image data; a second generating step of generating an image file on the basis of the image data when an operation unit that instructs start of the photographing operation is operated; and a step of recording the image file generated from the first state to a second state in a storage unit in association with the time-series pressure data when the second state in which the photographing device is placed from the water into the air is detected in the detection step.

The details as well as other features and advantages of this invention are set forth in the remainder of the specification and are shown in the accompanying drawings.

DETAILED DESCRIPTION OF THE PREFERRED EMBODIMENTS

First Embodiment

Figure 1:
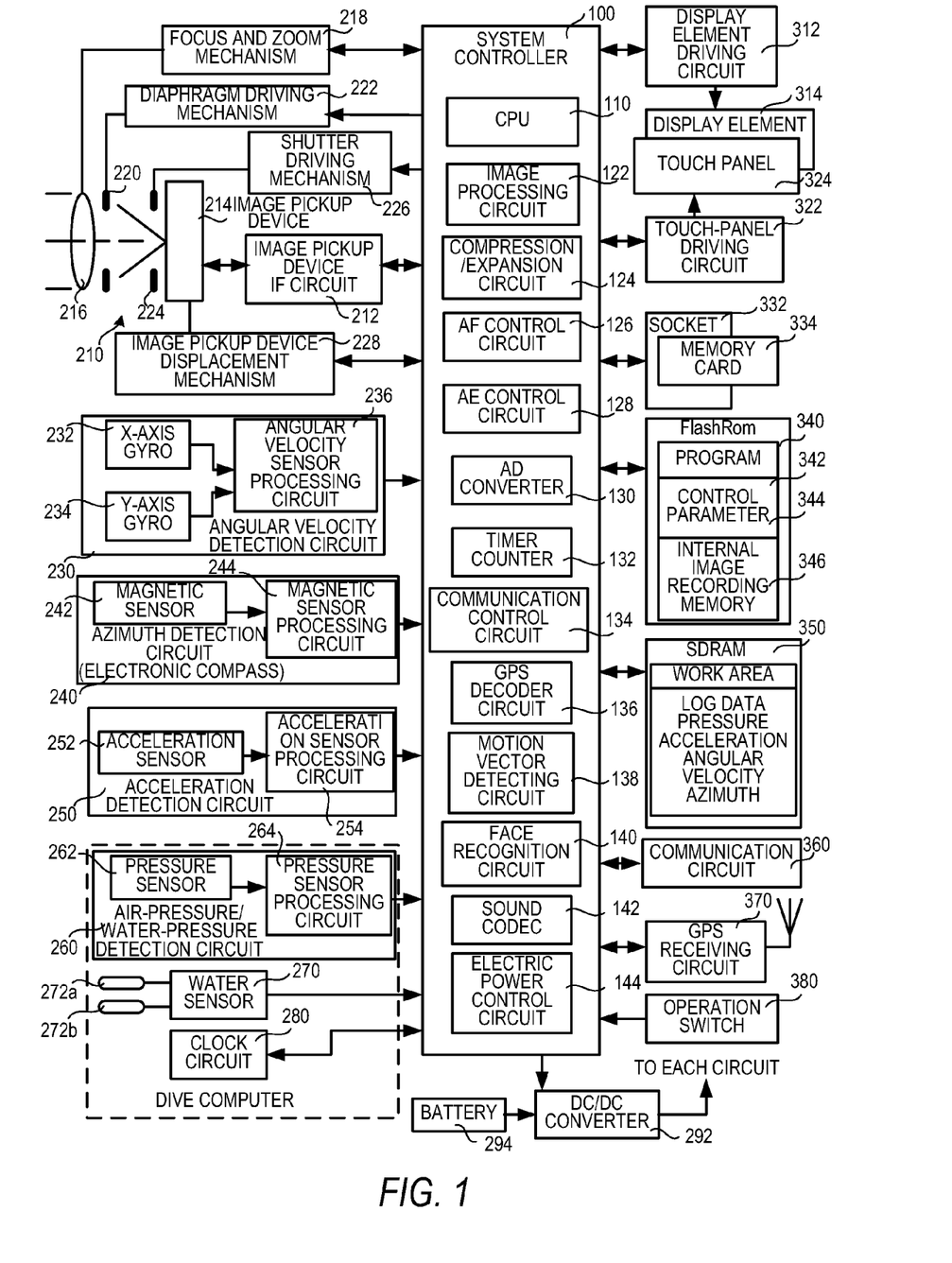
FIG. 1 is a block diagram schematically illustrating an internal configuration of a digital camera.

FIG. 1 is a block diagram schematically illustrating an internal configuration of a digital camera (also referred to simply as a camera). The digital camera is capable of an underwater photographing operation, that is, of underwater photographing.

A system controller 100 which functions as a control unit that controls an operation of the digital camera is provided with a CPU 110 and a plurality of circuit blocks (functional blocks). The plurality of circuit blocks include an image processing circuit 122, a compression/expansion circuit 124, an AF (autofocus) control circuit 126, an AE (automatic exposure) control circuit 128, an AD (analog-digital) converter 130, a timer counter 132, a communication control circuit 134, a GPS (Global Positioning System) decoder circuit 136, a motion vector detecting circuit 138, a face recognition circuit 140, a sound codec circuit 142, an electric power control circuit 144 and the like. The CPU 110 and the plurality of circuit blocks are connected to each other via a control line and a bus line, and each circuit block is controlled by an instruction of the CPU 110.

The system controller 100 is connected to an image pickup device 214 through an image pickup device IF (interface) circuit 212. Also, the system controller 100 is connected to a focus-and-zoom mechanism 218 that drives a photographing lens 216, a diaphragm driving mechanism 222 that drives a diaphragm 220 of the photographing lens 216, a shutter driving mechanism 226 that drives a shutter 224, and an image pickup device displacement mechanism 228 that moves the image pickup device 214. The focus-and-zoom mechanism 218 is a mechanism that adjusts a focal position of the photographing lens 216 and a focal distance of the photographing lens 216. The diaphragm 220 driven by the diaphragm driving mechanism 222 controls an amount of light which passes through the photographing lens 216 and reaches the image pickup device 214. The shutter 224 driven by shutter driving mechanism 226 sets the image pickup device 214 to an exposure state or a light shielded state. The image pickup device displacement mechanism 228 is a mechanism that displaces the image pickup device 214 on a plane perpendicular to an optical axis of the photographing lens 216 during an exposure operation in order to prevent deterioration of an image by hand shake.

The photographing lens 216 forms an image of light taken in from the outside of the camera on the image pickup device 214. The image pickup device 214 converts an image of a subject (optical image) formed by the image pickup device 214 to an image signal by photoelectric conversion. The image pickup device 214 is a CCD (charge coupled device) or a CMOS (complementary metal-oxide semiconductor) sensor, for example. The image pickup device IF circuit 212 includes a circuit that generates a driving signal of the image pickup device 214 in accordance with a control signal of the system controller 100, an AD conversion circuit that AD-converts an output of the image pickup device 214 and the like. The image signal of the optical image is AD-converted by the image pickup device IF circuit 212 and inputted into the system controller 100 as image data. The image pickup device IF circuit 212, the image pickup device 214, and the photographing lens 216 constitute a photographing unit 210 that obtains a subject image as image data.

The system controller 100 is further connected to an angular velocity detection circuit 230, an azimuth detection circuit (electronic compass) 240, an acceleration detection circuit 250, an air-pressure/water-pressure detection circuit 260, a water sensor 270, and a clock circuit 280. The air-pressure/water-pressure detection circuit 260, the water sensor 270, and the clock circuit 280 constitute a dive computer.

The dive computer may be provided separately from the camera and attached to a body or may be provided as an accessory that can be detachably attached to the camera. If the dive computer is provided separately from the camera, it may have a communication function so as to communicate with the camera. Also, the dive computer may be built in the camera.

The angular velocity detection circuit 230 has an angular velocity sensor (an X-axis gyro 232, a Y-axis gyro 234) and an angular velocity sensor processing circuit 236. Also, the azimuth detection circuit 240 has a magnetic sensor (azimuth sensor) 242 and a magnetic sensor processing circuit 244. Also, the acceleration detection circuit 250 has an acceleration sensor 252 and an acceleration sensor processing circuit 254. Also, the air-pressure/water-pressure detection circuit 260 has a pressure sensor 262 and a pressure sensor processing circuit 264.

The system controller 100 is electrically connected to a display element 314 through a display element driving circuit 312, is electrically connected to a touch panel 324 though a touch panel driving circuit 322, and is electrically connected to a detachable memory card 334 through a socket 332. The memory card 334 can store image files. The display element driving circuit 312 and the display element 314 constitute a display unit. The display element 314 and the touch panel 324 constitute a touch-panel display.

Also, the system controller 100 is connected to a Flash Rom 340 as a non-volatile memory, a SDRAM 350 as a volatile memory, a communication circuit 360, a GPS receiving circuit 370, and an operation switch 380, which is an operation unit (or an operation member) of the digital camera. The Flash Rom 340 stores a program 342 and a control parameter 344. The Flash Rom 340 also has an internal image storage memory 346, which is a region in which the image file can be stored. The Flash Rom 340, the SDRAM 350, and the memory card 334 constitute a storage unit that stores image information.

The CPU 110 of the system controller 100 controls the circuit blocks so that the following operations are performed. The image processing circuit 122 applies processing of γ-correction, color conversion, demosaicing and the like to the image data outputted from the image pickup device IF circuit 212 and outputs the result to the compression/expansion circuit 124. The image processing circuit 122 may process the image data for display inputted from the image pickup device IF circuit 212 with a predetermined frame rate (30 fps, 60 fps) and output the result to the display element driving circuit 312 when the digital camera is in a photographing-ready state. This photographing-ready state is a state in which the digital camera is set in an image recording mode, and a user is directing the digital camera to a subject.

The display element driving circuit 312 displays an image on the basis of the image data outputted from the image processing circuit 122 to the display element 314. The image displayed on the display element 314 at this time is generally called a through image, a live view image, a monitor image and the like.

The compression/expansion circuit 124 compresses the image data outputted from the image processing circuit 122 and records the result in the memory card 334. The compression/expansion circuit 124 also expands the compressed image data read from the memory card 334 and outputs the results to the display element driving circuit 312 when the digital camera is set in an image reproduction mode. The display element driving circuit 312 outputs an image on the basis of the image data inputted from the compression/expansion circuit 124 to the display element 314. The display element 314 displays the image inputted from the display element driving circuit 312.

On the display element 314, the touch panel 324 is arranged, and the touch-panel driving circuit 322 detects an operation position (a position pressed or contacted by a finger or a pen and the like) on the touch panel 324 and outputs the result to the system controller 100.

The AF control circuit 126 adjusts the position of the photographing lens 216 so that sharpness of the image is maximized on the basis of the image data outputted from the image pickup device IF circuit 212 during display of the live view image. In this embodiment, a focus adjusting method called a contrast method in general is used. The AE control circuit 128 determines conditions such as a diaphragm set value, a shutter speed, a white balance or γ-correction when a still image is obtained on the basis of the image data outputted from the image pickup device IF circuit 212 during the display of the live view image.

The AD converter 130 converts the outputs of the sensor or the detection circuit disposed in the digital camera to digital data.

The timer counter 132 generates a time signal to be the basis of an operation and notifies it to the CPU 110. On the basis of the output of the timer counter 132, time including operation time of the digital camera, obtainment interval of the image data, measurement interval of outputs of the sensor or the detection circuit, exposure time of the image pickup device, photographing interval in interval photographing and the like are set.

The communication control circuit 134 controls the communication circuit 360 constituted by an USB device controller, an USB host controller, an IEEE 1394 controller, an Ethernet (registered trademark) controller, a wireless LAN controller and the like, for example. As a result, the digital camera and an external device are made communicable.

The GPS decoder circuit 136 obtains trajectory information (radio wave) received by the GPS receiving circuit 370 from a NAVSTAR satellite. The CPU 110 detects position information of the digital camera on the basis of the obtained trajectory information.

The motion vector detection circuit 138 detects a motion amount of an entire image or a motion amount of a specific subject on the basis of a motion vector between image data inputted in a time series from the image pickup device IF circuit 212.

The face recognition circuit 140 is a circuit that detects the position of a human face in the image from the image data inputted from the image pickup device IF circuit 212.

The sound codec circuit 142 AD-converts a sound signal outputted from a microphone, not shown, through a microphone amplifier with a predetermined sampling rate and converts the result to a sound file (MP3, WMA and the like) in a sound recording operation. And the sound codec circuit 142 stores the sound file in the memory card 334. In a sound reproduction operation, the sound codec circuit 142 reads the sound file from the memory card 334, converts it to a sound signal and outputs it to a speaker amplifier. The speaker amplifier amplifies the inputted sound signal and reproduces the sound from a speaker, not shown.

The electric power control circuit 144 controls a DC/DC converter 292, converts the output of a battery 294 to a predetermined voltage and supplies electric power to each circuit unit.

The angular velocity sensor processing circuit 236 receives the outputs of the X-axis gyro 232 and the Y-axis gyro 234, converts them to predetermined signals and outputs the signals to the AD converter 130. The CPU 110 receives the output data of the angular velocity sensor processing circuit 236 converted by the AD converter 130 and obtains shaking of the digital camera as angular velocity data. The angular velocity data can be used for calculating the position of the digital camera or a diving path of the user by a known method. Other than the above, by integrating the angular velocity data during the exposure operation, for example, a displacement amount of the image pickup device 214 required for offsetting displacement of the subject image caused by the shaking of the digital camera can be calculated.

The magnetic sensor (azimuth sensor) 242 is a sensor that detects a magnetic field of the earth. The output of the magnetic sensor 242 is converted by the magnetic sensor processing circuit 244 to a predetermined signal and inputted into the CPU 110 through the AD converter 130. The CPU 110 detects the azimuth (direction), which is information relating to an attitude of the camera on the basis of the magnetism of the earth. The azimuth can be used for calculating the position of the digital camera or the diving path of the user by a known method.

The acceleration sensor 252 detects acceleration applied to the camera. The output of the acceleration sensor 252 is converted by the acceleration sensor processing circuit 254 to a predetermined signal and inputted into the CPU 110 through the AD converter 130. The acceleration can be used for calculating the position of the digital camera or the diving path of the user by a known method.

The operation switch (operation unit) 380 includes a power switch that instructs on/off of a power source of the camera, a release switch that instructs start of a photographing operation, a zoom switch that instructs a zooming operation, a mode setting switch that sets an operation mode, an up/down switch that sets a photographing condition and the like.

The pressure sensor 262 detects the pressure received by the camera or the pressure of the environment where the camera is placed. The pressure becomes an index of water depth where the camera is placed. The CPU 110 obtains detection data (output data) of the pressure sensor 262 converted by the AD converter 130. The CPU 110 calculates the water depth where the camera is placed on the basis of the obtained detection data. Typically, the water depth is in proportion with the pressure.

The water sensor 270 is a detection unit that electrically detects whether the camera is placed in water or in the gas (air). For example, the water sensor 270 detects electric resistance or electric conductivity between two electrodes 272a and 272b. The CPU 110 obtains detection data (output data) of the water sensor 270 converted by the AD converter 130. The CPU 110 determines whether the camera is placed in water or in the air on the basis of the obtained detection data.

The clock circuit 280 detects time. The clock circuit 280 transmits start time or end time and the like of underwater photographing to the CPU 110 in accordance with the instruction from the CPU 110.

Figure 2:
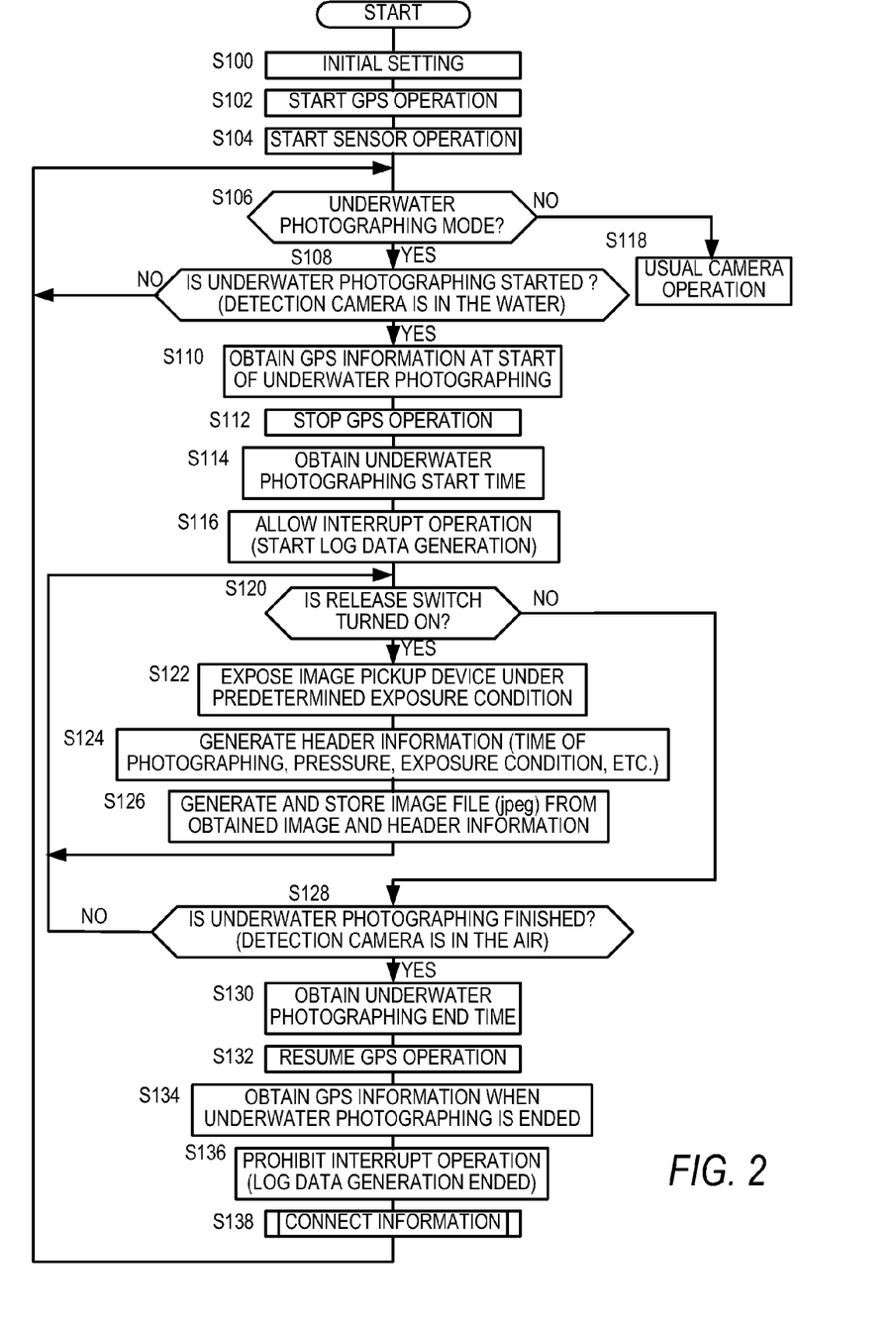
FIG. 2 is a flowchart illustrating a main routine of control executed by a system controller.

Referring to FIG. 2, an operation of the digital camera according to this embodiment will be described. Here, an operation of the CPU 110 in the system controller 100 executed on the basis of a program code 342 stored in the Flash Rom 340 will be described by referring to the flowchart.

At Step S100, when the power switch is turned on and the system controller 100 is started, an operation of initial setting (initialization of memory, initialization of peripheral circuits and the like) is performed.

At Step S102, an operation of the GPS is started. The CPU 110 starts position detection of the digital camera on the basis of the trajectory information obtained by the GPS decoder circuit 136 from the GPS receiving circuit 370. At Step S104, the CPU 110 starts an operation of each sensor such as the X-axis gyro 232, the Y-axis gyro 234, the magnetic sensor 242, the acceleration sensor 252, the pressure sensor 262, the water sensor 270 and the like. The CPU 110 starts reading of the output data from each sensor.

At Step S106, it is determined if the camera is in the underwater photographing mode or not. That is, it is determined whether or not the underwater photographing mode was selected by the mode setting switch. If the camera is in the underwater photographing mode, the routine proceeds to Step S108. If the camera is not in the underwater photographing mode, the routine proceeds to Step S118. At Step S118, a usual camera operation is performed.

At Step S108, it is determined whether the underwater photographing has been started or not. That is, on the basis of the output data of the water sensor 270, it is determined whether the camera is in a state placed in the water (first state) or not. Whether or not the camera is placed in the water may be determined on the basis of the output data of the pressure sensor 262. If the underwater photographing has been started, the routine proceeds to Step S110. If the underwater photographing has not been started, the routine returns to Step S106.

At Step S110, GPS information (position information of the digital camera) at the start of the underwater photographing is obtained, and a start position of the underwater photographing is detected. At Step S112, since reception of a radio wave in the water is difficult, the GPS operation is stopped. At Step S114, start time of the underwater photographing is obtained from the clock circuit 280.

At Step S116, in order to record log data (LogData: time-series historical data), the timer counter 132 is set and an interrupt operation is allowed. The timer counter 132 is set so as to generate interrupt in every predetermined cycle (1 sec (second), for example). As a result, the interrupt is generated in every predetermined cycle in parallel with the operation of the main routine in FIG. 2, and an interrupt processing routine "log data recording processing" (FIG. 3) is called and executed. Through this processing routine "log data recording processing", an output from each sensor (pressure, acceleration, angular velocity, azimuth) is measured in every predetermined cycle. The log data can be used for acquiring the position (water depth and the like) of the camera during the underwater photographing.

At Step S120, it is determined whether or not the release switch has been turned on. If the release switch is turned on, the routine proceeds to Step S122. If the release switch has not been turned on, the routine proceeds to Step S128.

At Step S122, the image pickup device is exposed under a predetermined exposure condition, and the image data is obtained. The predetermined exposure condition is determined by the AE control circuit 128. At Step S124, header information for the image data to be obtained is generated. The header information includes photographing conditions such as an exposure condition (Tv value, Av value, exposure mode (diaphragm preference mode and the like)) and the like in addition to the photographing time and a pressure when photographing.

Figure 5A:
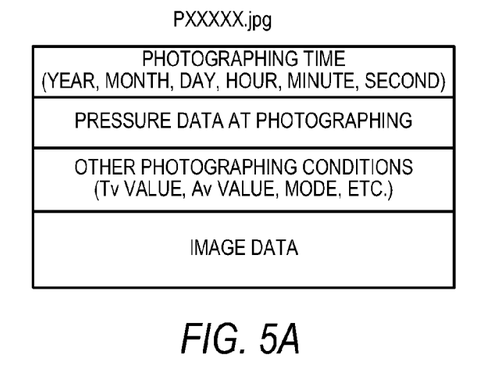
FIG. 5A is a diagram illustrating an example of an image file.

At Step S126, the CPU 110 generates and stores an image file on the basis of the image data obtained at Step S122 and the header information generated at Step S124. The header information is stored in a header section of the image file, and the image file is made up of the header information and an image in a predetermined format (JPEG format, for example). The image file is stored in a folder (DCIM-1000LY) generated in compliance with the DCF standard, for example, in the memory card 334 or the SDRAM 350 (internal image memory 346). An example of the image file is shown in FIG. 5A.

At Step S128, it is determined whether the underwater photographing has been finished or not. That is, on the basis of the output data of the water sensor 270, it is determined whether the camera is in a state placed in the air (second state) or not. Whether or not the camera is placed in the air may be determined on the basis of the output data of the pressure sensor 262. These operations correspond to a detection unit that detects whether the photographing device is placed in the water or in the air. If the underwater photographing has been finished, the routine proceeds to Step S130. If the underwater photographing has not been finished, the routine returns to Step S120.

At Step S130, the end time of the underwater photographing is obtained from the clock circuit 280. At step S132, the GPS operation is resumed. The CPU 110 starts position detection of the digital camera on the basis of the trajectory information obtained by the GPS decoder circuit 136 from the GPS receiving circuit 370. At Step S134, the GPS information (position information of the digital camera) is obtained when the underwater photographing is finished, and the end position of the underwater photographing is detected. At Step S136, the interrupt operation is prohibited. At Step S138, information connection processing, which will be described later, that associates the log data with the image data is executed. The information connection processing is preferably executed immediately after the underwater photographing is finished but it may be executed when the power switch of the photographing device is turned off and the operation of the photographing device is stopped, for example.

Figure 3:
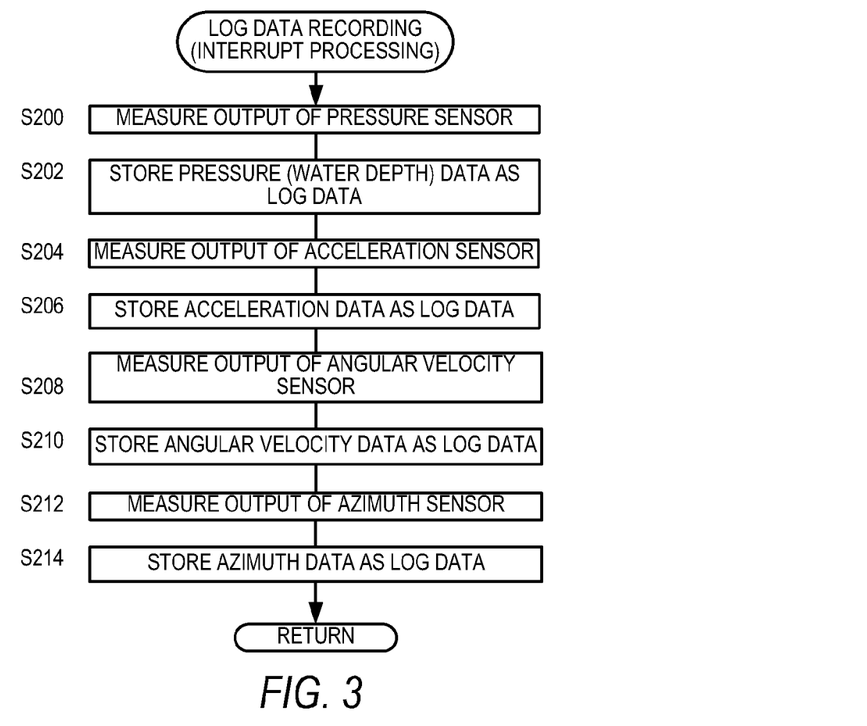
FIG. 3 is a flowchart illustrating an interrupt routine of log data recording processing executed by the system controller.

A flowchart in FIG. 3 illustrates the interrupt processing routine of the log data recording processing.

At Step S200, an output (pressure) from the pressure sensor 262 is measured. At Step S202, the pressure (water depth) data is stored in the SDRAM 350 (memory) as the log data (time-series historical data). The log data is a series of data measured in a time series.

At Step S204, an output (acceleration) from the acceleration sensor 252 is measured. At Step S206, the acceleration data is stored in the SDRAM 350 as the log data.

At Step S208, an output (angular velocity) from the angular velocity sensor (the X-axis gyro 232, the Y-axis gyro 234) is measured. At Step S210, the angular velocity data is stored in the SDRAM 350 as the log data.

At Step S212, an output (azimuth) from the azimuth sensor (magnetic sensor 242) is measured. At Step S214, the azimuth data is stored in the SDRAM 350 as the log data. Outputs of the acceleration sensor, the angular velocity sensor, and the azimuth sensor do not necessarily have to be recorded as the log data. However, if the photographing device has at least any one of the acceleration sensor, the angular velocity sensor, and the azimuth sensor, the output of this sensor is preferably recorded as the log data along with the output of the pressure sensor. For example, it is possible to acquire an amount of movement of the user in the water by integrating the outputs of the acceleration sensor, and convenience in using the log data of the pressure sensor is improved.

Figure 4:
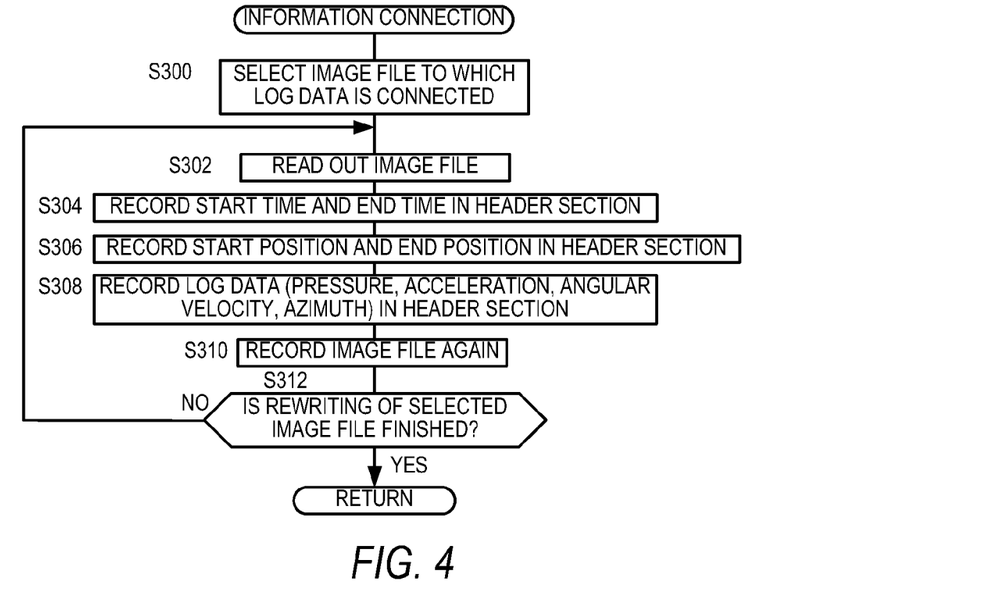
FIG. 4 is a flowchart illustrating a control routine of information connection processing according to a first embodiment.

A flowchart in FIG. 4 illustrates a subroutine of the information connection processing executed at Step S138.

At Step S300, one or more image files to which the log data is connected are selected. The selected image files are image files generated from the start time to the end time of one session of the underwater photographing, for example. At Step S302, one of the selected image files are read out.

Figure 5B:
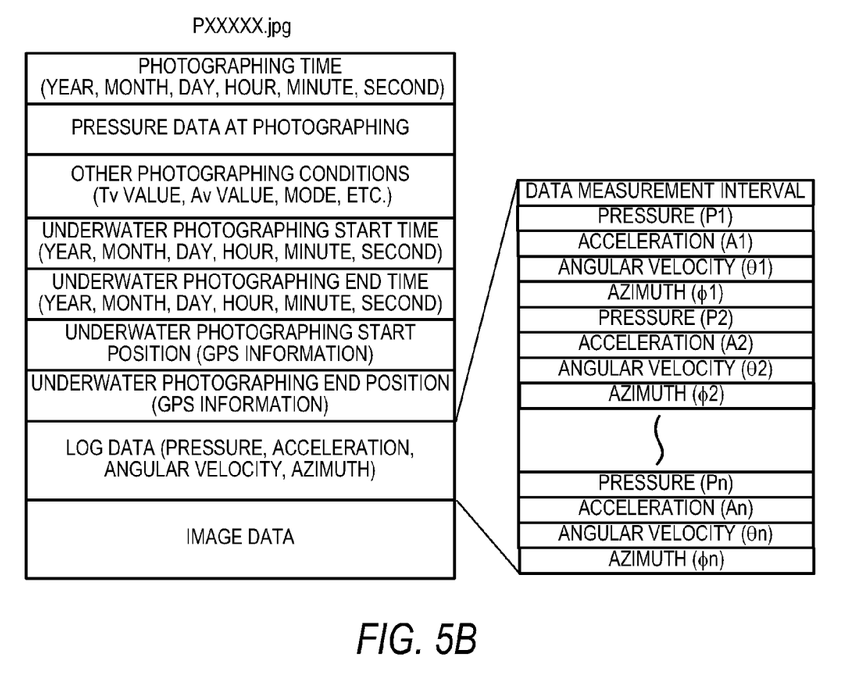
FIG. 5B is a diagram illustrating an example of an updated image file.

At Step S304, the start time and the end time of the underwater photographing are recorded in the header section of the read-out image file. At Step S306, the start position and the end position of the underwater photographing is recorded in the header section of the image file. At Step S308, the log data is further recorded in the header section of the image file. As a result, the log data to acquire the position of the camera during the underwater photographing (water depth etc.) is associated with the image data obtained in the underwater photographing. Also, the measurement interval of the data (pressure, acceleration, angular velocity, and azimuth) is recorded in the header section of the image file. The data measurement interval may be a predetermined cycle (1 sec, for example), which is the interrupt interval of the interrupt processing routine "log data recording processing" (FIG. 3). At Step S310, the image file is stored again and rewritten (updated). An example of the image file stored again is illustrated in FIG. 5B. In the above description, the log data is stored in the header section (position prior to the image data) of the image file. However, this storage position is not limited to the header section but may be stored in a footer section (position after the image data) of the image file.

At Step S312, it is determined whether all the image files selected at Step S300 have been rewritten or not. If all the selected image files have not been rewritten, the routine returns to Step S302, and the subsequent image file is read out. If all the selected image files have been rewritten, the subroutine of the information connection processing is finished.

Figure 6:
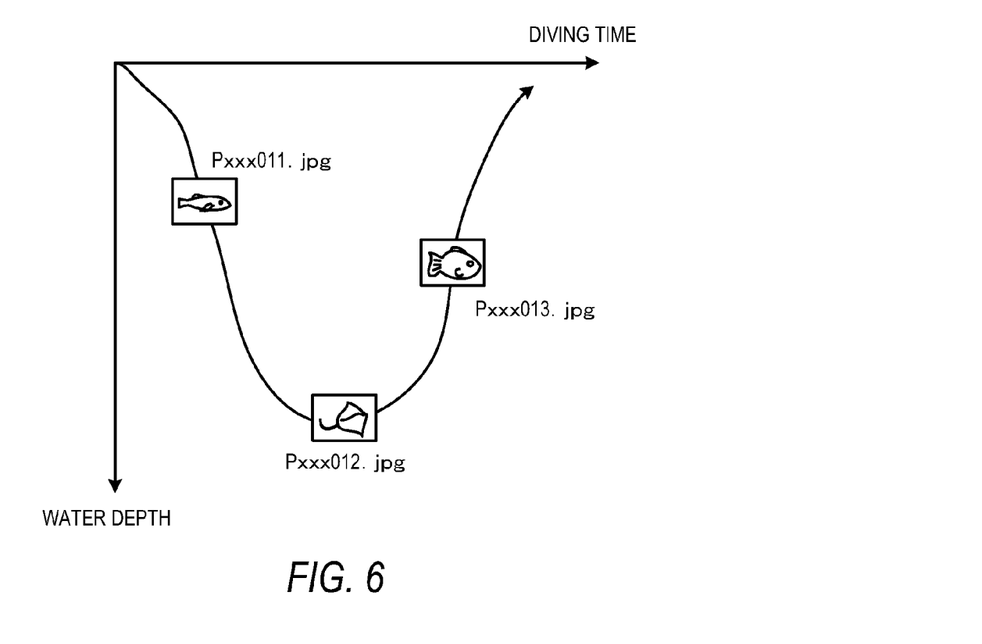
FIG. 6 is an example of display in which an image taken underwater is arranged on a graph indicating a relationship between duration of a dive and a water depth.

For example, as shown in FIG. 6, the camera or a separate computer (information equipment) can generate a graph indicating a relationship between diving time and the water depth (change of the water depth over time), from the log data of the underwater photographing start time, underwater photographing end time, data measurement interval, and pressure recorded in the header section of the image file in FIG. 5B. The camera or a separate computer (information equipment) can arrange the image (it may be a thumbnail) taken in the water on the graph so that the image is displayed by the display unit or on a monitor. From the photographing time recorded in the header section, it can be determined at what position on the graph the image is to be arranged.

Figure 7:
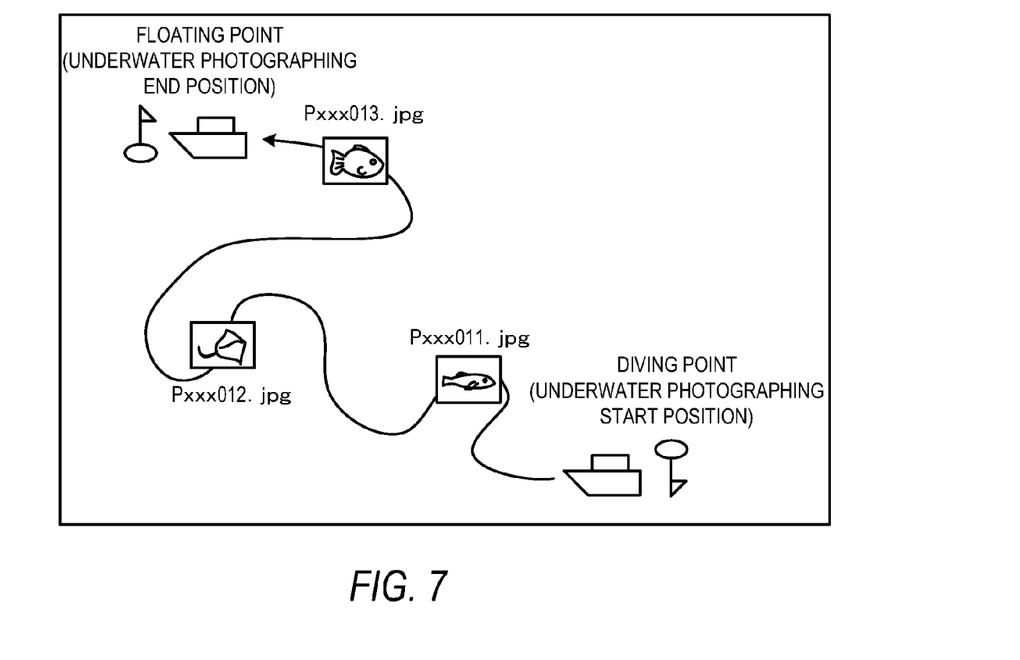
FIG. 7 is an example of the display in which the image taken underwater is arranged on a map indicating a diving path of the user.

Also, for example, as shown in FIG. 7, the camera or a separate computer (information equipment) can generate a map indicating a diving path of the user on a horizontal plane using the image file obtained in the end in FIG. 5B. The camera or a separate computer can arrange the image (it may be a thumbnail) taken in the water on the map so that the image is displayed by the display unit or on a monitor. The diving path of the user on the horizontal plane can be calculated by using an existing method from the underwater photographing start position recorded in the header section of the image file and the underwater photographing end position, log data (at least one of acceleration, angular velocity, and the azimuth), and data measurement interval. At the same time, a relationship between a point on the diving path and time can be calculated. From the photographing time recorded in the header section, it can be determined at what position on the diving path the image is to be arranged.

The digital camera may additionally have a velocity sensor in order to calculate the camera position and the diving path of the user using the velocity. In that case, the log data of the velocity is also obtained similarly to the acceleration, angular velocity, and azimuth and is recorded in the header section of the image file.

According to the first embodiment, the controller (control unit) 100 generates time-series pressure data (pressure log data) by measuring the output of the pressure sensor 262 in a predetermined cycle when detecting the first state in which the photographing device (camera) is placed from the air into the water on the basis of the output of the water sensor (detection unit) 270. The controller 100 associates the image file generated from the first state to the second state with the time-series pressure data and records it in the storage unit (memory card, SDRAM and the like) when detecting the second state in which the photographing device is placed from the water into the air on the basis of the output of the water sensor (detection unit) 270.

As a result, since the log data for calculating the position (water depth) of the camera during the underwater photographing is associated with the image data obtained in the underwater photographing and stored, the image can be associated with the photographing process of the underwater photographing. For example, when an image is to be seen after the underwater photographing is finished, the point where the image was taken during the photographing process or diving path can be associated with the image and displayed by the display unit or the like.

When the release switch (operation unit) is operated, the controller 100 records the image file generated on the basis of the image data in the storage unit. When the second state is to be detected, the controller reads out the image file generated from the first state to the second state from the storage unit and adds the time-series pressure data to the header section of each of the read-out image files and then, records it again in the storage unit. Since the time-series pressure data is added to the header section of each of the image files, the photographing process of the underwater photographing can be easily associated with the image.

The photographing device has the GPS that detects position information of the photographing device, and the controller 100 adds the position information of the photographing device obtained in the first state and the second state to the header section together with the time-series pressure data. As a result, the start position and the end position of the underwater photographing can be stored in association with the image.

The photographing device is provided with at least one of the azimuth sensor, the acceleration sensor, and the angular velocity sensor. The controller 100 measures an output of at least one of the sensors in synchronization with generation of the pressure data. The controller 100 generates the time-series output data (log data) and adds this time-series output data to the header section together with the time-series pressure data. As a result, the photographing path of the user in the underwater photographing can be associated with the image. For example, when a user is to see an image after the underwater photographing is finished, the point where the image was taken in the photographing path or diving path of the underwater photographing can be associated with the image and displayed by the display unit or the like.

Second Embodiment

In the first embodiment, the information connection processing is executed in which the log data and the like is added to the header section of each image data taken during the underwater photographing. However, in the second embodiment, the information connection processing is executed by storing the image data taken during the underwater photographing and the log file and the like altogether in one folder. The other configurations are the same as those in the first embodiment.

Figure 8:
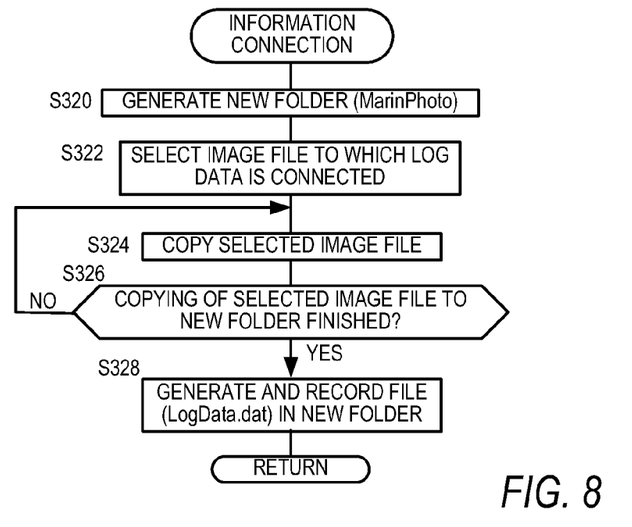
FIG. 8 is a flowchart illustrating a control routine of the information connection processing according to a second embodiment.

A flowchart in FIG. 8 illustrates a subroutine of the information connection processing (Step S138) in the second embodiment.

Figure 9:
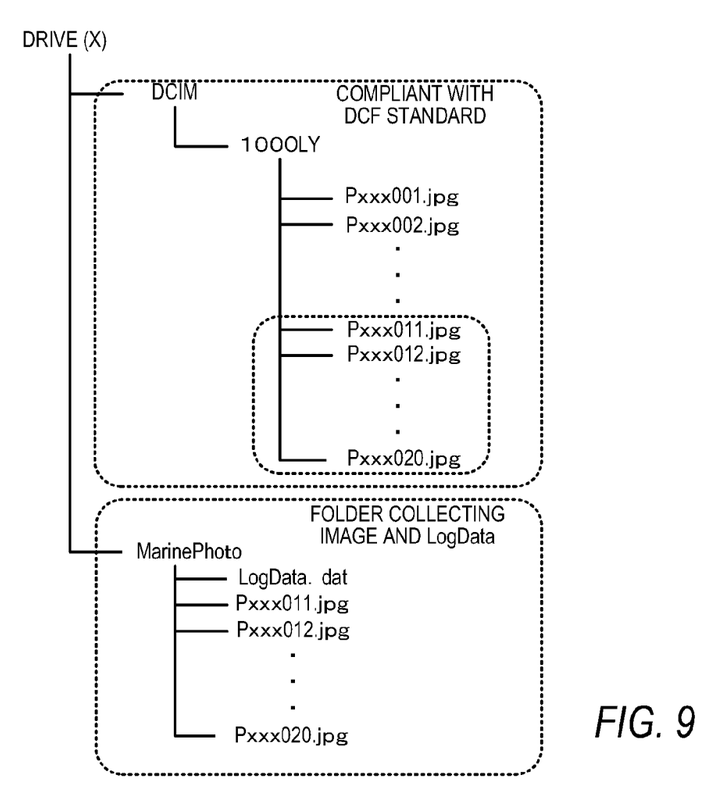
FIG. 9 is a tree diagram illustrating an example of directory information of a memory according to the second embodiment.

At Step S320, in the memory card 334 or the internal image memory 346, a new folder (here, named as MarinPhoto) is generated as in FIG. 9. At Step S322, one or more image files which the log data is connected to (associated with) is selected. This selected image file is an image file generated from the start time to the end time of one session of the underwater photographing, for example.

At Step S324, one of the selected image files is copied from a folder (DCIM-1000LY) generated in compliance with the DCF standard to the new folder (MarinPhoto).

At Step S326, it is determined whether all the image files selected at Step S322 have been copied or not. If all of the selected image files have not been copied, the routine returns to Step S324, and the subsequent image file is copied. If all the selected image files have been copied, the routine proceeds to Step S328.

Figure 10:
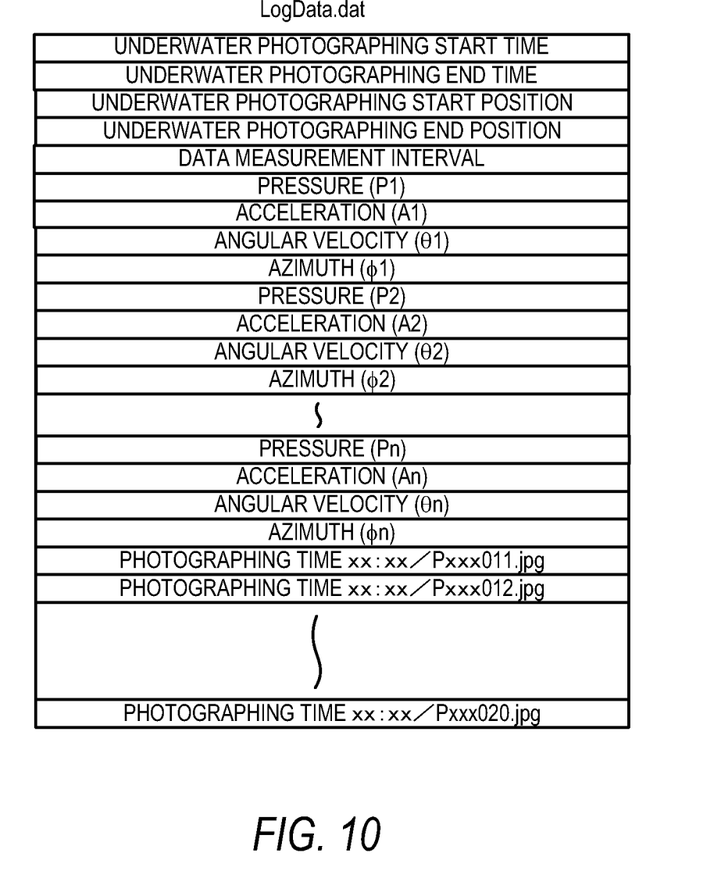
FIG. 10 is a diagram illustrating an example of a log file stored in a new folder according to the second embodiment.

At Step S328, the log file (named as LogData.dat, here), shown in FIG. 10 is generated and stored in the new folder (MarinPhoto). The log file (LogData.dat) includes a combination of an image file name and the photographing time, the underwater photographing start time, the underwater photographing end time, the underwater photographing start position, the underwater photographing end position, the measurement interval of data (pressure, acceleration, angular velocity, and azimuth), and the log data. As a result, the log data during the underwater photographing is associated with the image file obtained in the underwater photographing.

According to the second embodiment, the controller 100 starts to store the image file generated on the basis of the image data in the storage unit when the release switch (operation unit) is operated. When the second state is detected, the controller generates a folder in the storage unit, reads out the image file generated from the first state to the second state from the storage unit, and records it in the folder together with the time-series pressure data. Since the image file generated from the first state to the second state is stored in the same folder together with the time-series pressure data, the photographing process in the underwater photographing can be easily associated with the image.

The photographing device has the GPS that detects the position information of the photographing device, and the controller 100 records the position information of the photographing device obtained in the first and second states in the same folder together with the time-series pressure data. As a result, the start position and the end position of the underwater photographing can be stored in association with the image.

The photographing device is provided at least with one of the azimuth sensor, the acceleration sensor, and the angular velocity sensor. The controller 100 measures an output of at least one of the sensors in synchronization with generation of the pressure data, generates the time-series output data and records this time-series output data together with the time-series pressure data in the same folder. As a result, the photographing path or diving path of the user in the underwater photographing can be associated with the image. For example, when an image is to be seen after the underwater photographing is finished, the point where the image was taken in the photographing path or diving path of the underwater photographing can be associated with the image and displayed by the display unit or the like.

This invention is not limited to the above-mentioned embodiments, and it is apparent that various changes can be made within the scope of technical ideas thereof.

The present application claims priority from Japanese Patent Application No. 2010-119244 filed with the Japan Patent Office on May 25, 2010, the content of all of which is hereby incorporated by reference into this application.

What is claimed is:

1. A photographing device adapted to perform a photographing operation underwater, the photographing device comprising:
    an operation switch that initiates the photographing operation responsive to a manual user operation of the operation switch;
    a photographing unit that obtains a subject image as image data during the photographing operation;
    a pressure sensor that detects a water or air pressure on the photographing device;
    a detection unit that detects whether the photographing device is placed in water or in air; a storage unit that stores image information; and a controller that
    (1) generates an image file on the basis of the image data and stores the image file in the storage unit,
    (2) starts an operation of generating time-series pressure data on the basis of output of the pressure sensor when the photographing device enters a first state, in which movement of the photographing device from air into water is detected from an output of the detection unit,
    (3) stops the operation of generating the time-series pressure data when the photographing device enters a second state, in which movement of the photographing device from water into air is detected from an output of the detection unit,
    (4) associates any image files stored in the storage unit during a time from entering the first state to entering the second state with the time-series pressure data, and (5) stores again the any image files in the storage unit, wherein
    responsive to a manual user operation of the operation switch, the controller functions to store the image file generated on the basis of the image data in the storage unit, wherein when the second state is detected, the controller functions to read out the any image files generated during the time from entering the first state to entering the second state from the storage unit, and wherein the controller associates the any image files stored in the storage unit with the time-series pressure data by adding the time-series pressure data to a header section or a footer section of each of the read-out image files, to generate modified image files.

2. The photographing device according to claim 1, further comprising:
    a GPS unit that detects position information of the photographing device, wherein
    the controller functions to add the position information of the photographing device detected by the GPS unit in the first and second states to the header section or the footer section together with the time-series pressure data.

3. The photographing device according to claim 1, further comprising:
    at least one of an azimuth sensor, an acceleration sensor, or an angular velocity sensor, wherein the controller functions to measure an output of the at least one of the azimuth, acceleration and angular velocity sensors in synchronization with generation of the pressure data, generate time-series output data, and add the time-series output data to the header section or the footer section together with the time-series pressure data.

4. A method for use with a device capable of underwater image acquisition, the method comprising:
    a) detecting that the device moves from air into water;
    b) responsive to the detection that the device is underwater, repeatedly
        1) measuring an output of a pressure sensor,
        2) measuring an output of at least one of (A) an acceleration sensor, (B) an angular velocity sensor, or (C) an azimuth sensor, and
        3) storing, as underwater log data, the measured output of the pressure sensor and the measured output of the at least one of (A) an acceleration sensor, (B) an angular velocity sensor, or (C) an azimuth sensor;
    c) receiving at least one manual image pickup user input;
    d) responsive to each of the at least one manual image pickup user input,
        1) capturing an image, and
        2) storing an image file corresponding the captured image;
    e) detecting that the device moves from water into air;
    f) associating each of the at least one image file with the underwater log data
    g) responsive to the detection that the device moves from air into water, obtaining first time and/or date information;
    h) responsive to the detection that the device is moves from water into air, obtaining second time and/or date information; and i) associating each of the at least one image file with the first time and/or date information and the second time and/or date information, in addition to the underwater log data, wherein the act of associating each of the at least one image file with the first time and/or date information and the second time and/or date information, in addition to the underwater log data includes, for each of the at least one stored image file,
   1) reading out the stored image file,
   2) inserting the stored underwater log data, the first time and/or date information and the second time and/or date information into at least one of (A) a header of the read-out image file, or (B) a footer of the read-out image file, to generate a modified image file, and
   3) storing the modified image file.

* * * * *